(12) United States Patent
Matsumoto et al.

(10) Patent No.: US 12,489,275 B2
(45) Date of Patent: Dec. 2, 2025

(54) METHOD FOR MANUFACTURING OPTICAL SEMICONDUCTOR DEVICE

(71) Applicant: Mitsubishi Electric Corporation, Tokyo (JP)

(72) Inventors: Keisuke Matsumoto, Tokyo (JP); Ryoko Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 675 days.

(21) Appl. No.: 17/787,893

(22) PCT Filed: Jan. 28, 2020

(86) PCT No.: PCT/JP2020/002883
§ 371 (c)(1),
(2) Date: Jun. 21, 2022

(87) PCT Pub. No.: WO2021/152686
PCT Pub. Date: Aug. 5, 2021

(65) Prior Publication Data
US 2023/0045980 A1    Feb. 16, 2023

(51) Int. Cl.
*H01S 5/227*    (2006.01)
*H01S 5/30*    (2006.01)
*H01S 5/343*    (2006.01)

(52) U.S. Cl.
CPC .......... *H01S 5/2275* (2013.01); *H01S 5/3072* (2013.01); *H01S 5/34313* (2013.01)

(58) Field of Classification Search
CPC .. H01S 5/2275; H01S 5/3072; H01S 5/34313; H01S 5/2224; H01S 5/2226
See application file for complete search history.

(56) References Cited

U.S. PATENT DOCUMENTS 4,984,244 A * 1/1991 Yamamoto .............. H01S 5/227
372/45.01
5,693,558 A * 12/1997 Lee .......................... H01S 5/227
438/40
(Continued)

FOREIGN PATENT DOCUMENTS

JP    H02-020085 A    1/1990
JP    H102-079486 A    3/1990
(Continued)

OTHER PUBLICATIONS

International Search Report issued in PCT/JP2020/002883; mailed Apr. 7, 2020.

*Primary Examiner* — Joshua King
(74) *Attorney, Agent, or Firm* — Studebaker Brackett PLLC

(57) ABSTRACT

Provided here are: a mesa strip which has an n-type cladding layer, an active layer and a p-type cladding layer that are stacked sequentially on a surface of an n-type substrate; Fe-doped semi-insulating layers which are embedded along both sides of the mesa stripe, each up to a height higher than the mesa stripe; n-type blocking layers which are stacked on respective surfaces of the Fe-doped semi-insulating layers located on the both sides of the mesa stripe, and which are spaced apart from each other with an interval that is a space corresponding to a central portion of the active layer and is thus narrower than the active layer; p-type cladding layers which are formed on back surfaces of respective mesa-stripe-side end portions of the n-type blocking layers; and a p-type cladding layer which buries a top of the mesa stripe, the p-type cladding layers and the n-type blocking layers.

10 Claims, 30 Drawing Sheets

(56) References Cited

U.S. PATENT DOCUMENTS

| | | | |
|---|---|---|---|
| 6,556,605 B1 | 4/2003 | Shtengel et al. | |
| 8,798,110 B2* | 8/2014 | Takeuchi | H01S 5/3013 |
| | | | 372/45.01 |
| 9,647,425 B1* | 5/2017 | Nakamura | H01S 5/026 |
| 2002/0119661 A1 | 8/2002 | Watanabe et al. | |
| 2010/0190283 A1* | 7/2010 | Katsuyama | B82Y 20/00 |
| | | | 438/47 |
| 2011/0164641 A1 | 7/2011 | Yoshida et al. | |
| 2011/0261855 A1 | 10/2011 | Takeuchi et al. | |
| 2014/0302628 A1* | 10/2014 | Takeuchi | H01S 5/3013 |
| | | | 438/39 |
| 2015/0244152 A1* | 8/2015 | Tsunami | H01S 5/34313 |
| | | | 438/46 |
| 2016/0028213 A1 | 1/2016 | Sakaino | |
| 2017/0207604 A1 | 7/2017 | Watanabe | |
| 2021/0044083 A1* | 2/2021 | Hayakawa | H01S 5/3434 |
| 2021/0044090 A1* | 2/2021 | Fuchida | H01S 5/2206 |

FOREIGN PATENT DOCUMENTS

| | | | | |
|---|---|---|---|---|
| JP | H0279486 A * | 3/1990 | | |
| JP | H03-227089 A | 10/1991 | | |
| JP | H105-075209 A | 3/1993 | | |
| JP | H10-065263 A | 3/1998 | | |
| JP | 2002-198616 A | 7/2002 | | |
| JP | 2011-249766 A | 12/2011 | | |
| JP | 5545670 B2 | 7/2014 | | |
| JP | 2016-031970 A | 3/2016 | | |
| JP | 2017-108061 A | 6/2017 | | |
| JP | 2017-130657 A | 7/2017 | | |
| JP | 2019-071397 A | 5/2019 | | |
| WO | WO-2019193679 A1 * | 10/2019 | | H01S 5/2206 |

* cited by examiner

METHOD FOR MANUFACTURING OPTICAL SEMICONDUCTOR DEVICE

TECHNICAL FIELD

The present application relates to an optical semiconductor device and a method for manufacturing the same.

BACKGROUND ART

Recently, because of the significant increase in speed of optical communications, the number of applications that require high-speed operations increases for semiconductor lasers. Further, there is a need for a direct-modulation type semiconductor laser in which laser from a distributed feedback semiconductor laser is directly modulated at high speed, for achieving high-speed operations at low cost.

According to the direct-modulation type semiconductor laser capable of high-speed operations, it is required to reduce the parasitic capacitance. In particular, when it has a buried-type structure in which burying layers are provided on both sides of an active layer, it is effective to use semi-insulating semiconductor layers as these burying layers. An InP layer with iron (Fe) as a dopant is generally used as the semi-insulating semiconductor layer. Such an Fe-doped semi-insulating InP layer captures electrons; however, it does not capture holes. In the semiconductor laser having a buried-type structure, the respective side faces of a p-type InP cladding layer are in contact with the Fe-doped semi-insulating InP layers, so that, when holes are injected from the p-type InP layer into the Fe-doped semi-insulating InP layer, the injected holes may be recombined with captured electrons, causing a leakage current to flow. For the purpose of reducing the leakage current, an n-type InP blocking layer for capturing holes is provided between the p-type InP layer and the Fe-doped semi-insulating InP layer.

In Patent Document 1, as a method of reducing the leakage current, such an exemplary method is disclosed in which, after the formation of the n-type InP burying layers (blocking layers), a part of the p-type InP cladding layer is lightly etched using an insulating film processed to have a narrow width, and then additional n-type burying layers (blocking layers) are formed.

CITATION LIST

Patent Document

Patent Document 1: Japanese Patent No.5545670 (Paragraph 0025; FIG. 3)

SUMMARY OF THE INVENTION

Problems to be Solved by the Invention

However, there is a problem that, at the time of the formation of the n-type InP blocking layers, since the blocking layers are each grown selectively, its top end portion located above the active layer becomes narrow in width perpendicular to the active layer, so that the hole blocking effect is reduced and thus holes that should have been injected into the active layer will not be captured, resulting in a leakage current. Further, according to Patent Document 1, in each of the side faces of the p-type InP cladding layer, an area where it is in contact with the Fe-doped semi-insulating InP layer is made smaller; however, there is a problem that it is insufficient to reduce the leakage current.

This application discloses a technique for solving the problems as described above, and an object thereof is to provide an optical semiconductor device with a reduced leakage current, and a method for manufacturing the same.

Means for Solving the Problems

An optical semiconductor device disclosed in this application is characterized by comprising: a mesa strip which has a first conductivity-type cladding layer, an active layer and a second conductivity-type first cladding layer that are stacked sequentially on a surface of a first conductivity-type semiconductor substrate; burying layers which are embedded along both sides of the mesa stripe, each up to a height higher than the mesa stripe; first conductivity-type blocking layers which are stacked on respective surfaces of the burying layers located on the both sides of the mesa stripe, and which are spaced apart from each other with an interval that is a space corresponding to a central portion of the active layer and is thus narrower than the active layer; second conductivity-type second cladding layers which are formed on back surfaces of respective mesa-stripe-side end portions of the first conductivity-type blocking layers; and a second conductivity-type third cladding layer which buries a top of the mesa stripe, the second conductivity-type second cladding layers and the first conductivity-type blocking layers;
    wherein the second conductivity-type second cladding layers are each formed to have a carrier concentration that is higher than a carrier concentration of each of the second conductivity-type first cladding layer and the second conductivity-type third cladding layer.

A method for manufacturing an optical semiconductor device, disclosed in this application is characterized by comprising: a step of sequentially stacking a first conductivity-type cladding layer, an active layer and a second conductivity-type first cladding layer, on a surface of a first conductivity-type semiconductor substrate, and then sequentially stacking further an etching stopper layer and a second conductivity-type second cladding layer, to thereby form semiconductor layers; a step of etching the semiconductor layers to form a mesa stripe; a step of forming burying layers on both sides of the mesa stripe; a step of forming a first conductivity-type blocking layer on a top of the mesa stripe and surfaces of the burying layers; a step of forming a mask exposing an area of the first conductivity-type blocking layer corresponding to a central portion of the active layer, and then performing etching up to the etching stopper layer to create an opening; a step of removing the mask and the etching stopper layer; and a step of stacking a second conductivity-type third cladding layer on a surface inside the opening and a surface of the first conductivity-type blocking layer, and then stacking a second conductivity-type contact layer;
    wherein the second conductivity-type second cladding layer is formed to have a carrier concentration that is higher than a carrier concentration of each of the second conductivity-type first cladding layer and the second conductivity-type third cladding layer.

In another aspect, a method for manufacturing an optical semiconductor device, disclosed in this application is characterized by comprising: a step of sequentially stacking a first conductivity-type cladding layer, an active layer and a second conductivity-type first cladding layer, on a surface of a first conductivity-type semiconductor substrate, and then further stacking a second conductivity-type second cladding layer, to thereby form semiconductor layers; a step of etching the semiconductor layers to form a mesa stripe; a step of forming burying layers on both sides of the mesa stripe; a step of forming a first conductivity-type blocking layer on a top of the mesa stripe and surfaces of the burying layers; a step of forming a mask exposing an area of the first conductivity-type blocking layer corresponding to a central portion of the active layer, and then etching the first conductivity-type blocking layer and the second conductivity-type second cladding layer to create an opening; a step of removing the mask; and a step of stacking a second conductivity-type third cladding layer on a surface inside the opening and a surface of the first conductivity-type blocking layer, and then stacking a second conductivity-type contact layer;

wherein the second conductivity-type second cladding layer is formed to have a carrier concentration that is higher than a carrier concentration of each of the second conductivity-type first cladding layer and the second conductivity-type third cladding layer.

EFFECT OF THE INVENTION

According to this application, it is possible to reduce the leakage current from the active layer to the first conductivity-type blocking layer, and thus to achieve reduction in threshold current for laser emission, and power increase in light output.

MODES FOR CARRYING OUT THE INVENTION

Embodiment 1

Figure 1:
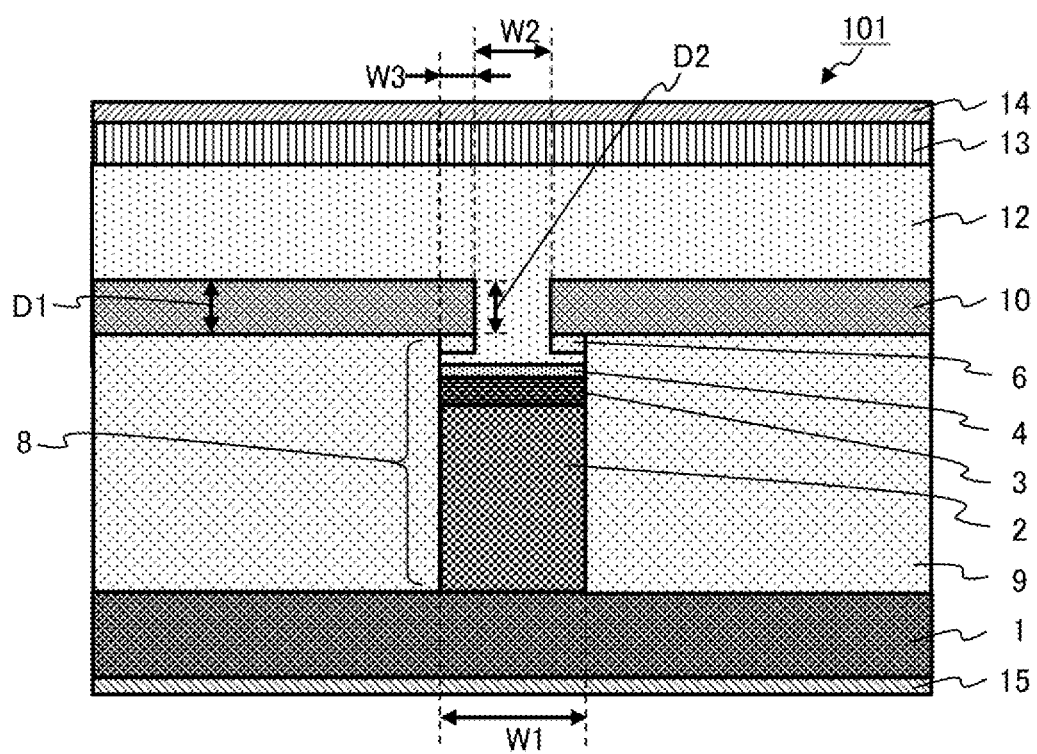
FIG. 1 is a sectional view showing a configuration of an optical semiconductor device according to Embodiment 1.

FIG. 1 is a sectional view showing a configuration of an optical semiconductor device 101 according to Embodiment 1 of this application. As shown in FIG. 1, in the optical semiconductor device 101, a mesa stripe 8 that extends in a [011] direction is formed on the surface of an n-type InP substrate 1 (a first conductivity-type semiconductor) with a plane orientation of (110). The mesa stripe 8 has a width W1 of 1.4 μm, for example.

The mesa stripe 8 is provided on the surface of the n-type InP substrate 1, and is composed of: an n-type InP cladding layer 2 (a first conductivity-type semiconductor); an active layer 3; a p-type InP cladding layer 4 (a second conductivity-type semiconductor) as a second conductivity-type first cladding layer; p-type InP cladding layers 6 (second conductivity-type semiconductors) as second conductivity-type second cladding layers; and a p-type InP cladding layer 12 (a second conductivity-type semiconductor) as a second conductivity-type third cladding layer; that are stacked sequentially. The both sides of the mesa stripe 8 are buried by Fe-doped semi-insulating InP layers 9 (semiconductors of any given conductivity type) as burying layers so that the respective side surfaces of the mesa stripe 8 are entirely covered thereby.

Although n-type InP blocking layers 10 (first conductivity-type semiconductors) are provided on the respective surfaces of the Fe-doped semi-insulating InP layers 9, they are formed to be disconnected above the active layer 3 by a width W2 that is narrower than the width W1 of the active layer. The width W2 is 1.0 µm, for example.

The p-type InP cladding layers 6 are formed above the active layer 3 and on the respective end portions of the back surfaces of the n-type InP blocking layers 10, so as to each have a width W3. The width W3 is 0.2 µm, for example. A thickness D2 of each of the n-type InP blocking layers 10 at its portion above the active layer 3 is equal to a thickness D1 thereof at its portion sufficiently distant (about several tens of micrometers) from the active layer 3. The thickness D1 and the thickness D2 may be freely set to from 300 to 1000 nm.

The p-type InP cladding layer 12 is formed to be placed between the surface of the p-type InP cladding layer 4 and the back surfaces of the n-type InP blocking layers 10, between the n-type InP blocking layers 10 in a disconnected state, and on the surfaces of the n-type InP blocking layers 10. On the surface of the p-type InP cladding layer 12, a p-type InGaAs contact layer 13 (a second conductivity-type semi-conductor) is formed. On the surface of the p-type InGaAs contact layer 13, a p-side electrode 14 is formed. On the back surface of the n-type InP substrate 1, an n-side electrode 15 is formed.

The carrier concentration of the p-type InP cladding layers 6 is set to be higher than the carrier concentration of each of the p-type InP cladding layer 4 and the p-type InP cladding layer 12. The carrier concentration may be freely set to from 0.5 to $3.0 \times 10E+18$ cm$^{-3}$.

Accordingly, the p-type InP cladding layers 6 that are higher in carrier concentration than the p-type InP cladding layer 4 are provided above the active layer 3 and between the p-type InP cladding layer 4 and the respective n-type InP blocking layers 10, so that the energy barrier at a pn-junction interface formed with the n-type InP blocking layer becomes higher, and this makes it possible to reduce the leakage current from the active layer to the n-type InP blocking layer. Further, with the provision of the p-type InP cladding layers each having a higher carrier concentration, it is also possible to reduce the element resistance.

Figure 2:
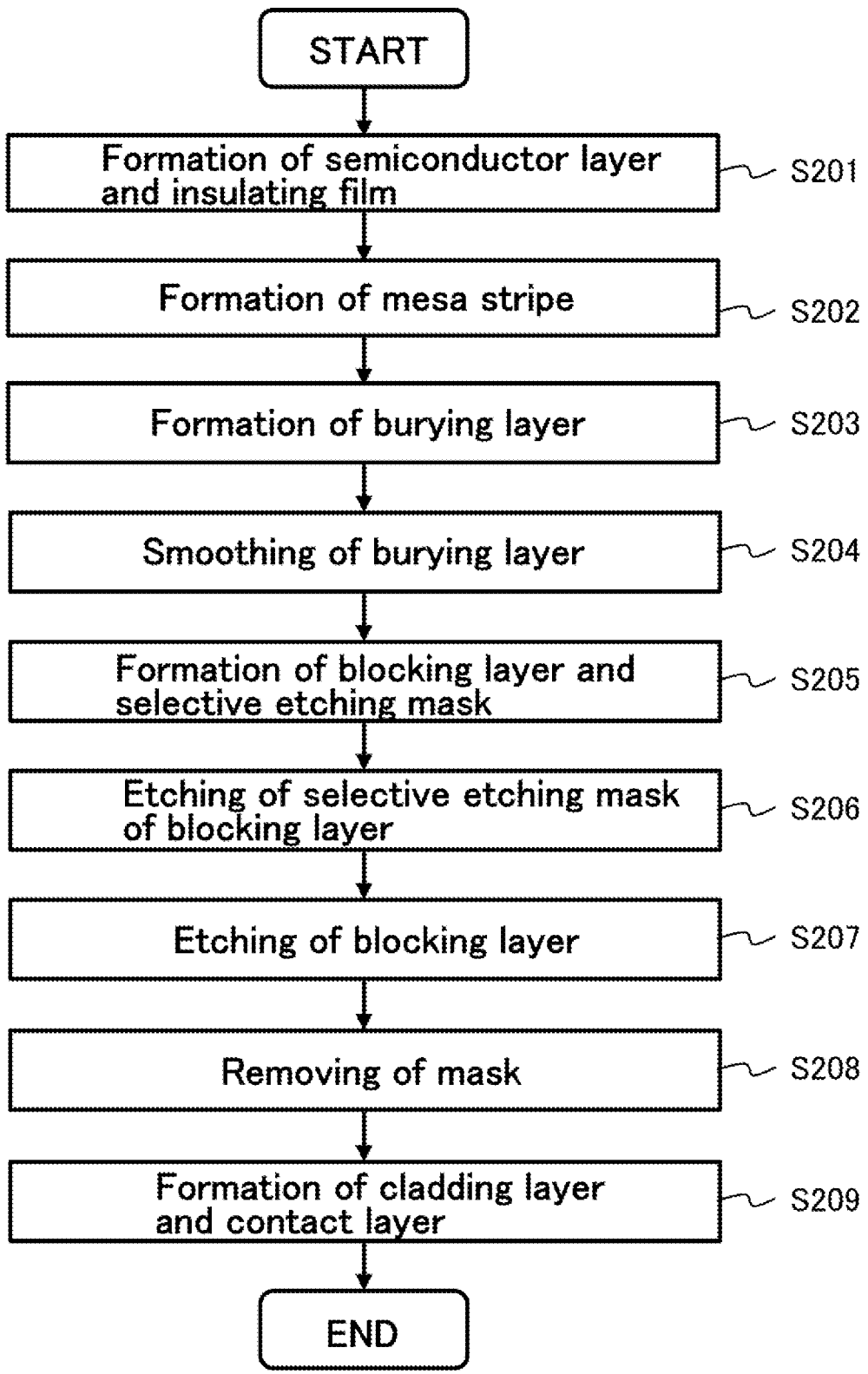
FIG. 2 is a flowchart showing manufacturing steps of the optical semiconductor device according to Embodiment 1.

Next, description will be made about a method for manufacturing the optical semiconductor device 101 according to Embodiment 1 of this application. FIG. 2 is a flowchart showing manufacturing steps of the optical semiconductor device 101. FIG. 3 to FIG. 11 are sectional views corresponding to FIG. 2, each showing a manufacturing step for the optical semiconductor device 101.

Figure 3:
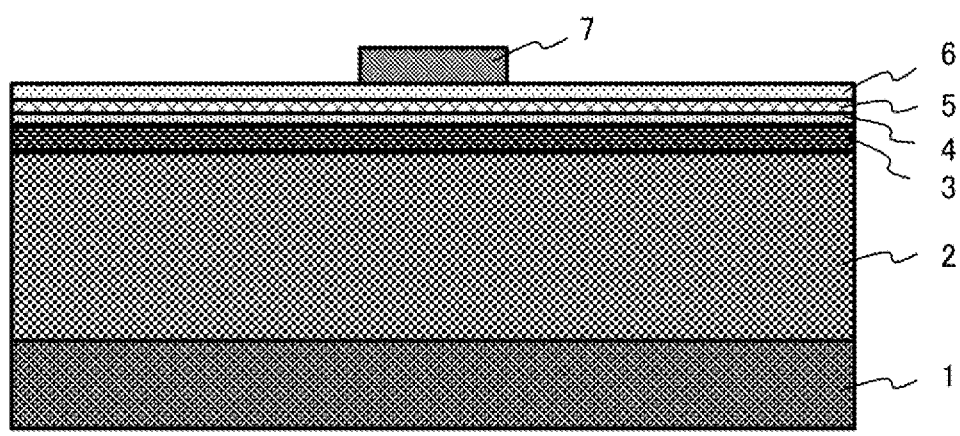
FIG. 3 is a sectional view showing a manufacturing step for the optical semiconductor device according to Embodiment 1.

First, as shown in FIG. 3, using an MOCVD (Metal Organic Chemical Vapor Deposition) method, an n-type InP cladding layer 2 (having a thickness of 100 to 200 nm and a carrier concentration of 0.1 to $1.0 \times 10E+18$ cm$^{-3}$), an active layer 3 with a multi-quantum well (MQW) structure which will serve as a light-emitting layer, a p-type InP cladding layer 4 (having a thickness of 50 to 400 nm and a carrier concentration of 0.5 to $3.0 \times 10E+18$ cm$^{-3}$), a p-type InGaAsP etching stopper layer 5 (having a thickness of 50 to 400 nm and a carrier concentration of 0.5 to $3.0 \times 10E+18$ cm$^{-3}$), and a p-type InP cladding layer 6 (having a thickness of 50 to 400 nm and a carrier concentration of 1.0 to $3.0 \times 10E+18$ cm$^{-3}$), are stacked, in this order, on the surface of an n-type InP substrate 1 with a plane orientation of (110), and thereafter, an insulating film 7 of SiO$_2$ or the like is deposited on the surface of the p-type InP cladding layer 6 and is processed to have an intended ridge width (Step S201).

It should be noted that the carrier concentration of the p-type InP cladding layer 6 is set to be higher than the carrier concentration of the p-type InP cladding layer 4. The carrier concentration may be freely set to from 0.5 to $3.0 \times 10E+18$ cm$^{-3}$. The ridge width is from about 0.5 to 2.0 µm.

Figure 4:
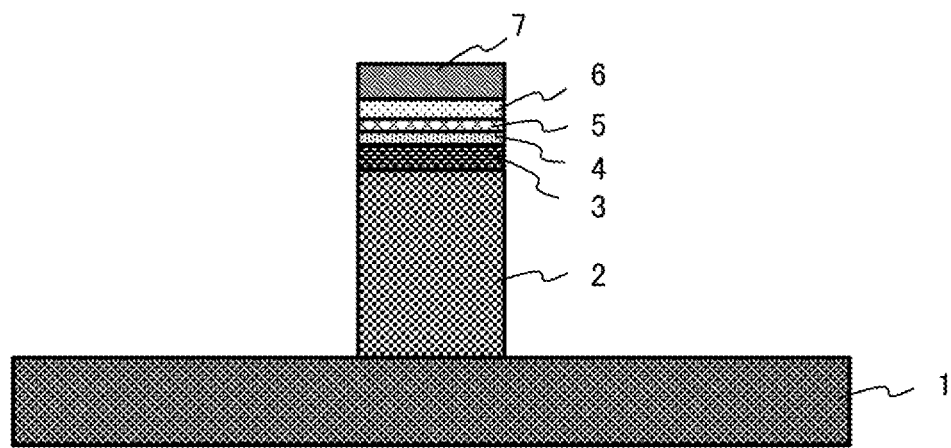
FIG. 4 is a sectional view showing a manufacturing step for the optical semiconductor device according to Embodiment 1.

Subsequently, as shown in FIG. 4, using the insulating film 7 as a mask, a portion from the p-type InP cladding layer 6 to the n-type InP cladding layer 2 or to an intermediate position in the n-type InP substrate 1, is etched by dry etching to thereby form a mesa stripe 8 (Step S202).

Here, dry etching is performed; however, the mesa stripe 8 may be formed by wet etching. The etching depth is about 1 to 4 µm. The mesa stripe extends in in a [011] direction.

Figure 5:
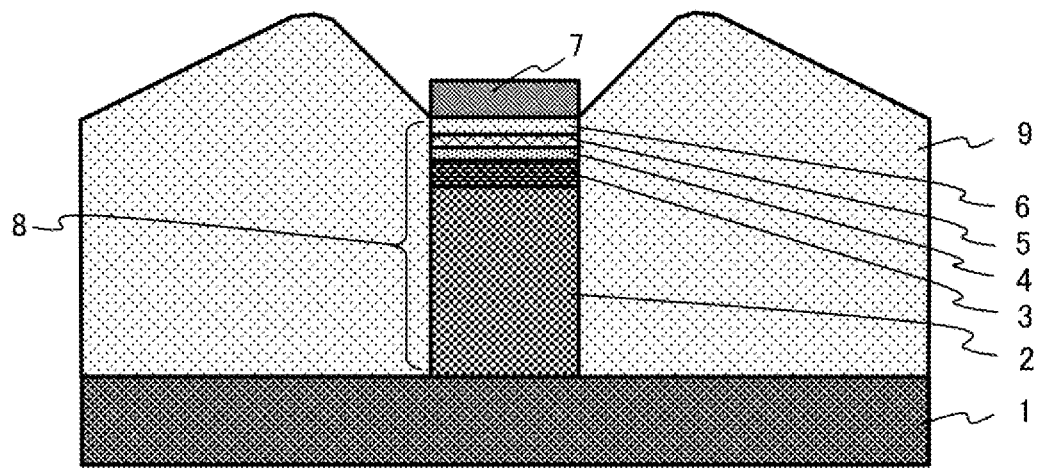
FIG. 5 is a sectional view showing a manufacturing step for the optical semiconductor device according to Embodiment 1.

Then, as shown in FIG. 5, Fe-doped semi-insulating InP layers 9 (each having a thickness of 1000 to 4000 nm and a carrier concentration of 0.01 to $9.0 \times 10E+18$ cm$^{-3}$) are grown to bury the both sides of the mesa stripe 8 (Step S203).

On this occasion, the Fe-doped semi-insulating InP layers 9 are grown so that the respective side surfaces of the mesa stripe 8 are entirely covered thereby.

Figure 6:
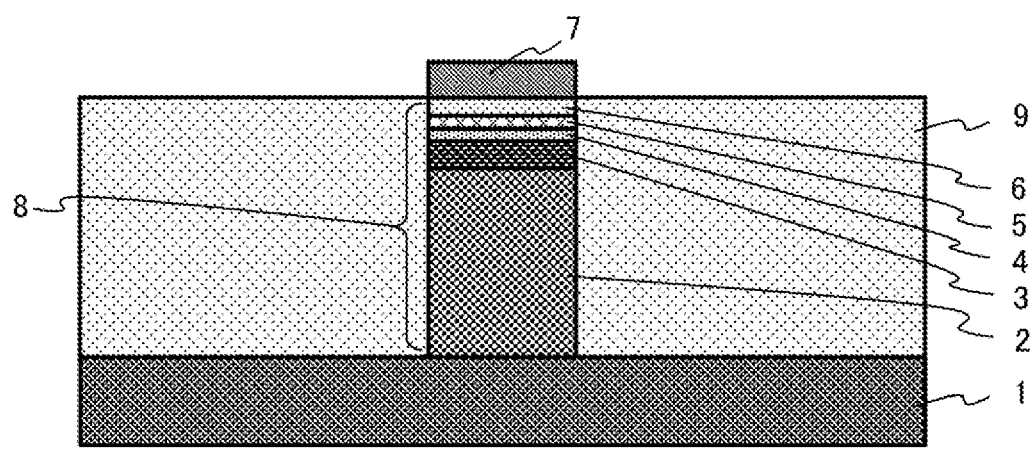
FIG. 6 is a sectional view showing a manufacturing step for the optical semiconductor device according to Embodiment 1.

Subsequently, as shown in FIG. 6, the Fe-doped semi-insulating InP layers 9 located on the both sides of the mesa stripe 8 are smoothed in such a manner that the surface protrusions of these layers are removed by an etchant containing hydrogen bromide and acetic acid (Step S204).

Figure 7:
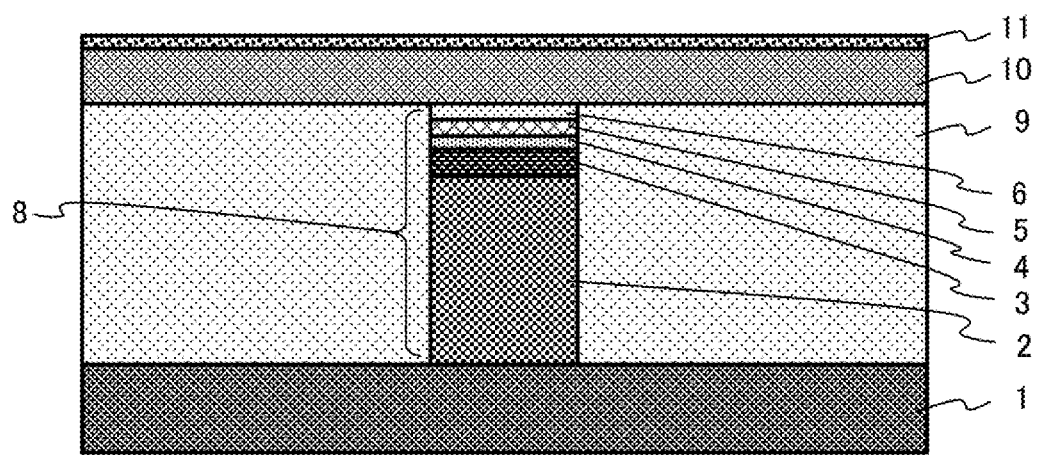
FIG. 7 is a sectional view showing a manufacturing step for the optical semiconductor device according to Embodiment 1.

Then, as shown in FIG. 7, after the insulating film 7 is removed using buffered hydrofluoric acid or hydrofluoric acid, an n-type InP blocking layer 10 (having a thickness of 300 to 1000 nm and a carrier concentration of 2.0 to $9.0 \times 10E+18$ cm$^{-3}$) and an n-type InGaAs layer 11 (having a thickness of 50 to 200 nm and a carrier concentration of 0.5 to $5.0 \times 10E+18$ cm$^{-3}$) that will serve as a mask for performing selective etching, are stacked in this order (Step S205).

Figure 8:
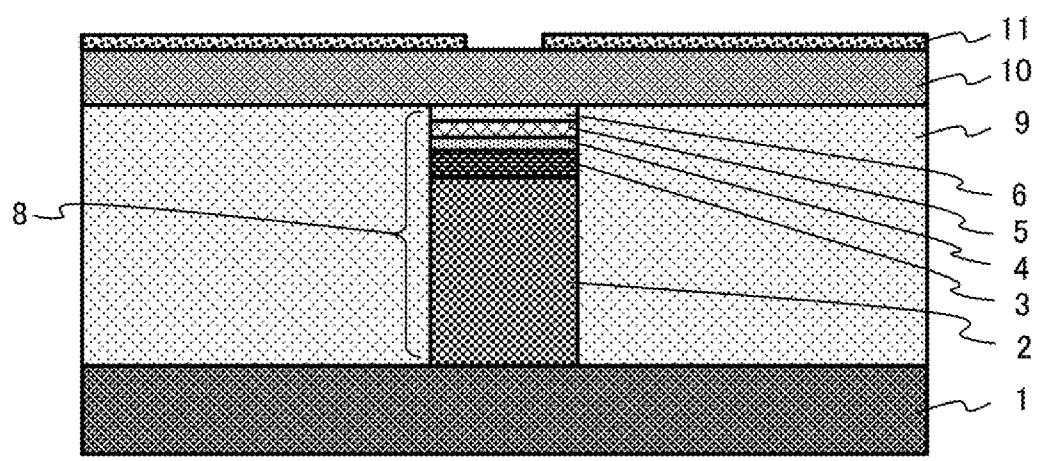
FIG. 8 is a sectional view showing a manufacturing step for the optical semiconductor device according to Embodiment 1.

Subsequently, as shown in FIG. 8, only the n-type InGaAs layer 11 is etched by dry etching or using nitric acid or the like, in such a manner that, in an unshown resist thereon, an opening that is narrower than the width of the active layer and placed above the active layer 3 is created by photolithography (Step S206).

Figure 9:
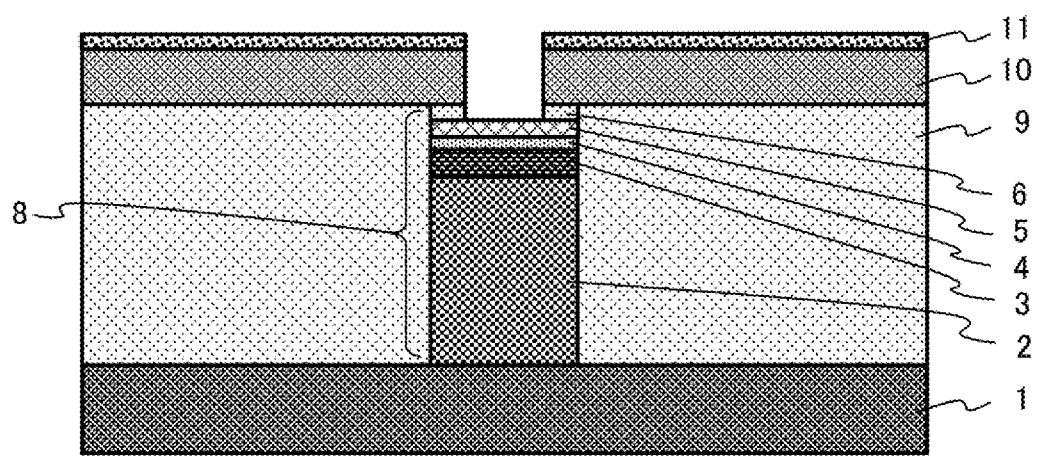
FIG. 9 is a sectional view showing a manufacturing step for the optical semiconductor device according to Embodiment 1.

Then, as shown in FIG. 9, using the n-type InGaAs layer 11 as an etching mask, portions of the n-type InP blocking layer 10 and the p-type InP cladding layer 6 above the active layer 3, are selectively etched up to the p-type InGaAsP etching stopper layer 5 by using an etchant such as hydrochloric acid or the like (Step S207).

Figure 10:
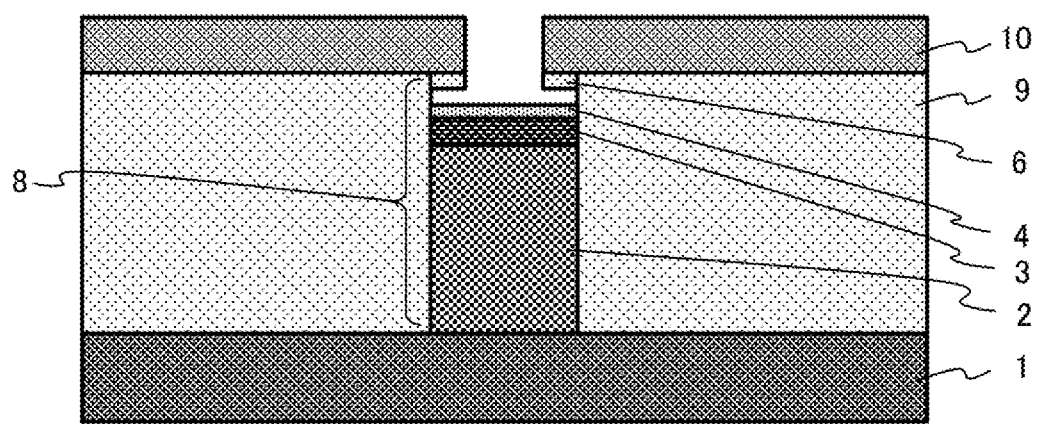
FIG. 10 is a sectional view showing a manufacturing step for the optical semiconductor device according to Embodiment 1.

Subsequently, as shown in FIG. 10, the n-type InGaAs layer 11 and the p-type InGaAsP etching stopper layer 5 are selectively etched using nitric acid or the like (Step S208).

Figure 11:
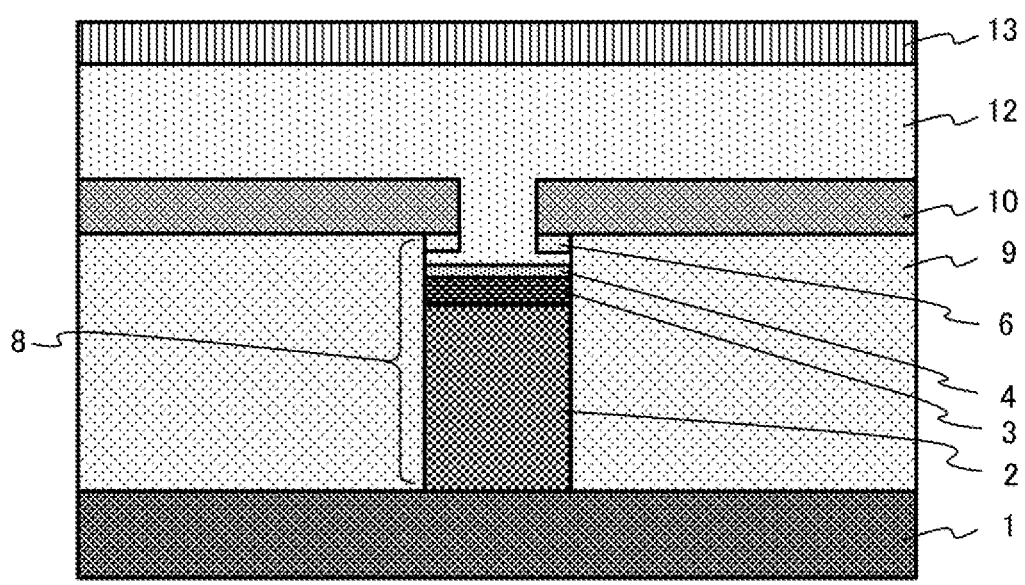
FIG. 11 is a sectional view showing a manufacturing step for the optical semiconductor device according to Embodiment 1.

Then, as shown in FIG. 11, a p-type InP cladding layer 12 (having a thickness of 100 to 4000 nm and a carrier concentration of 0.1 to $3.0 \times 10E+18$ cm$^{-3}$) and a p-type InGaAs contact layer 13 (having a thickness of 100 to 1000 nm and a carrier concentration of 1.0 to 10.0×10E+18 cm$^{-3}$) are stacked in this order (Step S209).

On this occasion, the carrier concentration of the P-type InP cladding layer 12 is set to be lower than the carrier concentration of the p-type InP cladding layer 6.

Lastly, a p-side electrode 14 is provided on the surface of the p-type InGaAs contact layer 13 and an n-side electrode 15 is provided on the back surface of the n-type InP substrate 1, so that the optical semiconductor device 101 shown in FIG. 1 is achieved.

As described above, the optical semiconductor device 101 according to Embodiment 1 comprises: the mesa strip 8 which has the n-type InP cladding layer 2, the active layer 3 and the p-type InP cladding layer 4 that are stacked sequentially on the surface of the n-type InP substrate 1; the Fe-doped semi-insulating InP layers 9 which are embedded along both sides of the mesa stripe 8, each up to a height higher than the mesa stripe 8; the n-type InP blocking layers 10 which are stacked on the respective surfaces of the Fe-doped semi-insulating InP layers 9 located on the both sides of the mesa stripe 8, and which are spaced apart from each other with an interval that is a space corresponding to a central portion of the active layer 3 and is thus narrower than the active layer 3; the p-type InP cladding layers 6 which are formed on the back surfaces of the respective end portions on the mesa stripe 8-side of the n-type blocking layers 10; and the p-type InP cladding layer 12 which buries the top of the mesa stripe 8, the p-type InP cladding layers 6 and the n-type InP blocking layers 10;
 wherein the p-type InP cladding layers 6 are each formed to have a carrier concentration that is higher than the carrier concentration of each of the p-type InP cladding layer 4 and the p-type InP cladding layer 12.

Accordingly, the energy barrier at the pn-junction interface formed with the n-type InP blocking layer becomes higher, and this makes it possible to reduce the leakage current from the active layer to the n-type InP blocking layer, and thus to achieve reduction in threshold current for laser emission, and power increase in light output.

Further, with the provision of the p-type InP cladding layers having a higher carrier concentration, an increase in optical loss is suppressed, so that it is also possible to reduce the element resistance. In addition, since selective growth is not used when the n-type InP blocking layers are formed, a film thickness thereof can be made thick even at a portion above the active layer, so that a leakage-current reduction effect can be expected.

Embodiment 2

In Embodiment 1, the Fe-doped semi-insulating InP layers 9 are smoothed, whereas in Embodiment 2, a case will be described where no smoothing is applied thereto.

Figure 12:
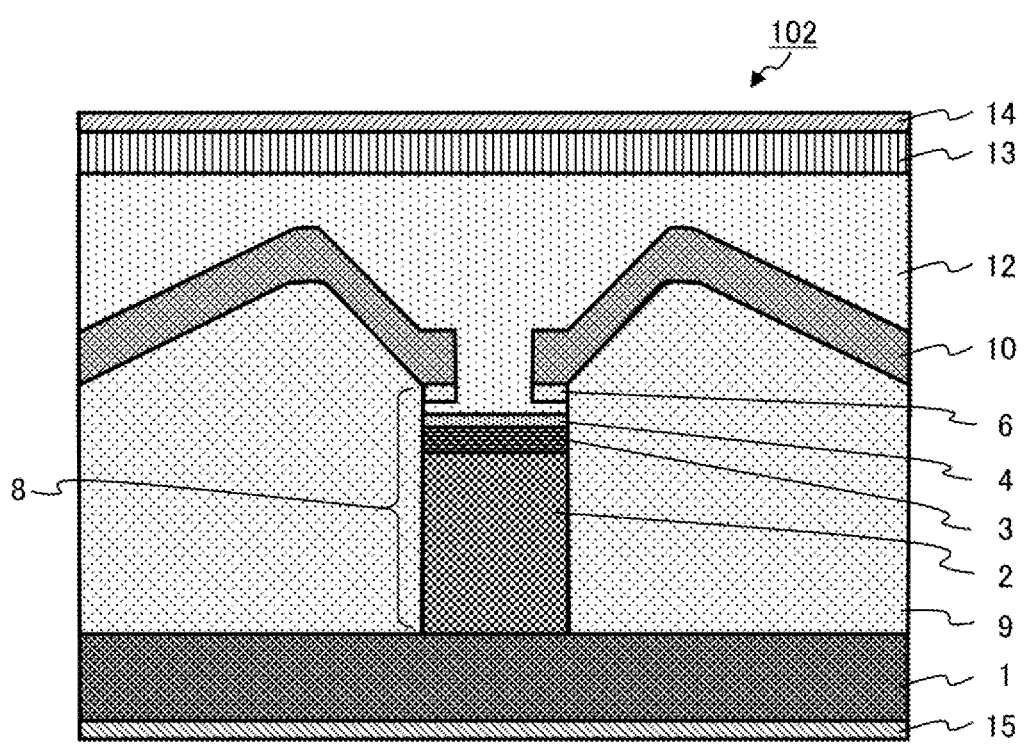
FIG. 12 is a sectional view showing a configuration of an optical semiconductor device according to Embodiment 2.

FIG. 12 is a sectional view showing a configuration of an optical semiconductor device 102 according to Embodiment 2 of this application. As shown in FIG. 12, unlike the optical semiconductor device 101 of Embodiment 1, in the optical semiconductor device 102, Fe-doped semi-insulating InP layers 9 whose surfaces are not smoothed are formed. The other configuration of the optical semiconductor device 102 according to Embodiment 2 is similar to that in the optical semiconductor device 101 of Embodiment 1, so that reference numerals that are the same as those in FIG. 1 are given to the corresponding parts and description thereof is omitted here.

Next, description will be made about a method for manufacturing the optical semiconductor device 102 according to Embodiment 2 of this application. The manufacturing steps of the optical semiconductor device 102 according to Embodiment 2 are equivalent to the flowchart (FIG. 2) showing the manufacturing steps of the optical semiconductor device 101 of Embodiment 1, except that the step of smoothing the burying layers (Step S204 in FIG. 2) is omitted, so that FIG. 2 is also used here. FIG. 13 to FIG. 17 are sectional views each showing a manufacturing step for the optical semi-conductor device 102 corresponding to FIG. 12.

Initial steps in the method for manufacturing the optical semiconductor device 102 according to Embodiment 2, are similar to the steps from the step of forming the semiconductor layers (Step S201; FIG. 3) to the step of forming the burying layers (Step S203; FIG. 5) in the method for manufacturing the optical semiconductor device 101 of Embodiment 1, so that the description thereof is omitted here.

Figure 13:
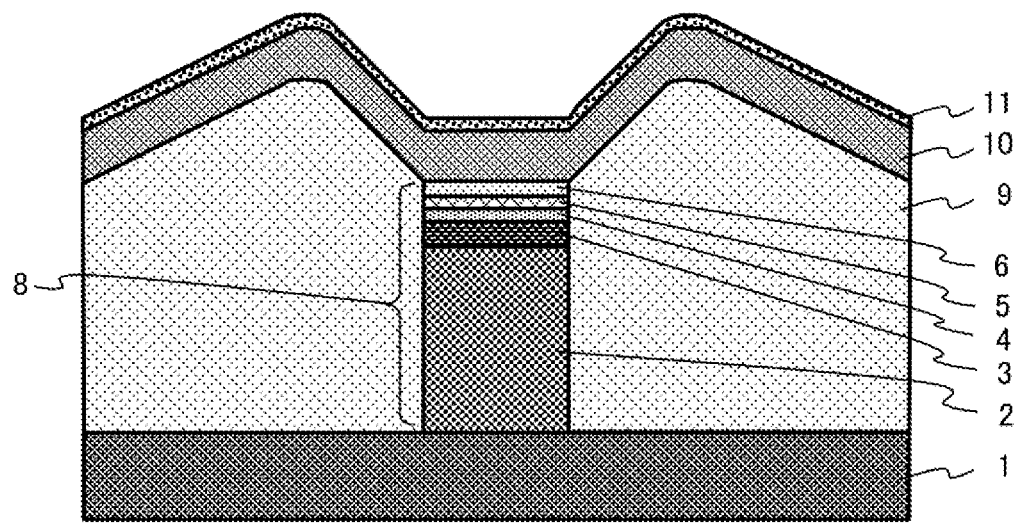
FIG. 13 is a sectional view showing a manufacturing step for the optical semiconductor device according to Embodiment 2.

Subsequently, with respect to the mesa stripe 8 buried by the Fe-doped semi-insulating InP layers 9 in Step S203 (see, FIG. 5), as shown in FIG. 13, after the insulating film 7 is removed using buffered hydrofluoric acid or hydrofluoric acid, an n-type InP blocking layer 10 (having a thickness of 300 to 1000 nm and a carrier concentration of 2.0 to 9.0×10E+18 cm$^{-3}$) and an n-type InGaAs layer 11 (having a thickness of 50 to 200 nm and a carrier concentration of 0.5 to 5.0×10E+18 cm$^{-3}$) that will serve as a mask for performing selective etching, are stacked in this order (Step S205).

Figure 14:
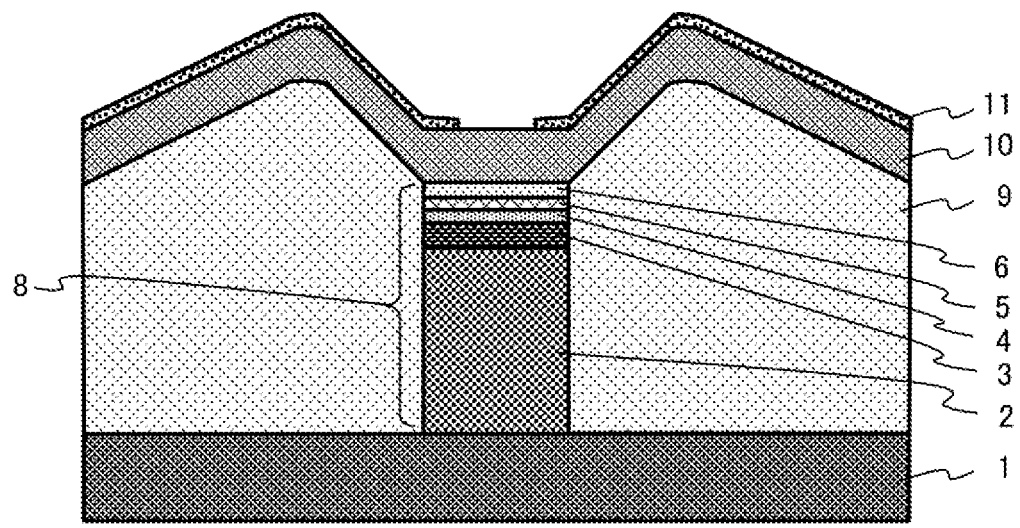
FIG. 14 is a sectional view showing a manufacturing step for the optical semiconductor device according to Embodiment 2.

Then, as shown in FIG. 14, only the n-type InGaAs layer 11 is etched by dry etching or using nitric acid or the like, in such a manner that, in an unshown resist thereon, an opening that is narrower than the width of the active layer and placed above the active layer 3 is created by photolithography (Step S206).

Figure 15:
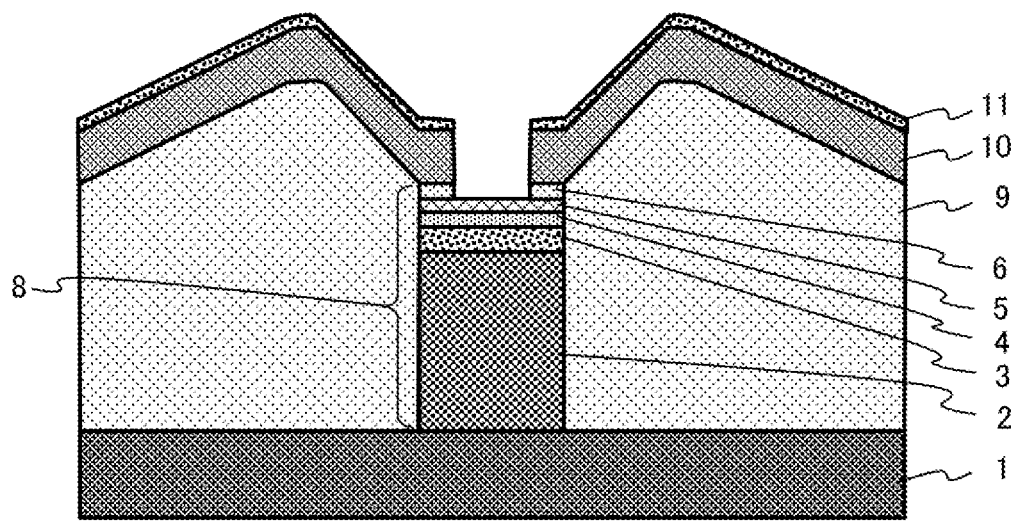
FIG. 15 is a sectional view showing a manufacturing step for the optical semiconductor device according to Embodiment 2.

Subsequently, as shown in FIG. 15, using the n-type InGaAs layer 11 as an etching mask, portions of the n-type InP blocking layer 10 and the p-type InP cladding layer 6 above the active layer 3, are selectively etched up to the p-type InGaAsP etching stopper layer 5 by using an etchant such as hydrochloric acid or the like (Step S207).

Figure 16:
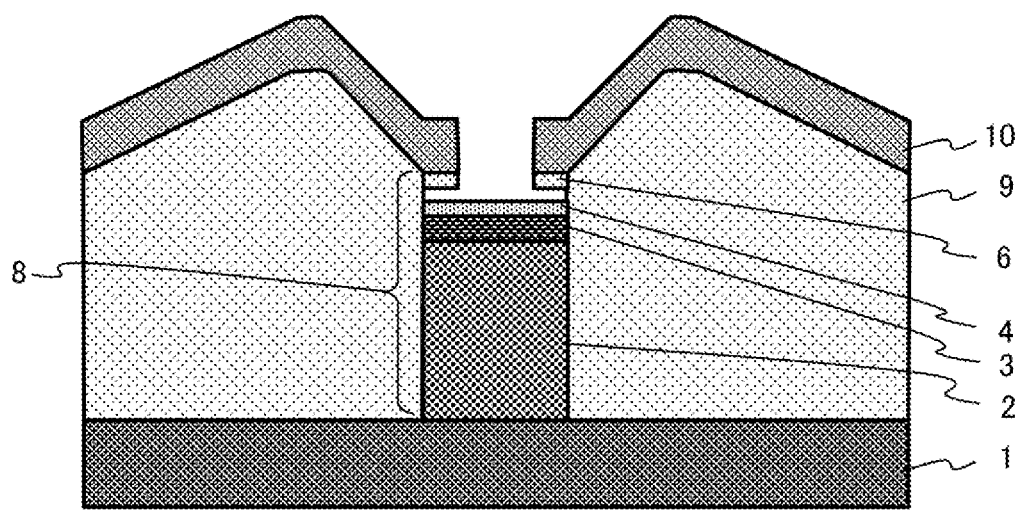
FIG. 16 is a sectional view showing a manufacturing step for the optical semiconductor device according to Embodiment 2.

Then, as shown in FIG. 16, the n-type InGaAs layer 11 and the p-type InGaAsP etching stopper layer 5 are selectively etched using nitric acid or the like (Step S208).

Figure 17:
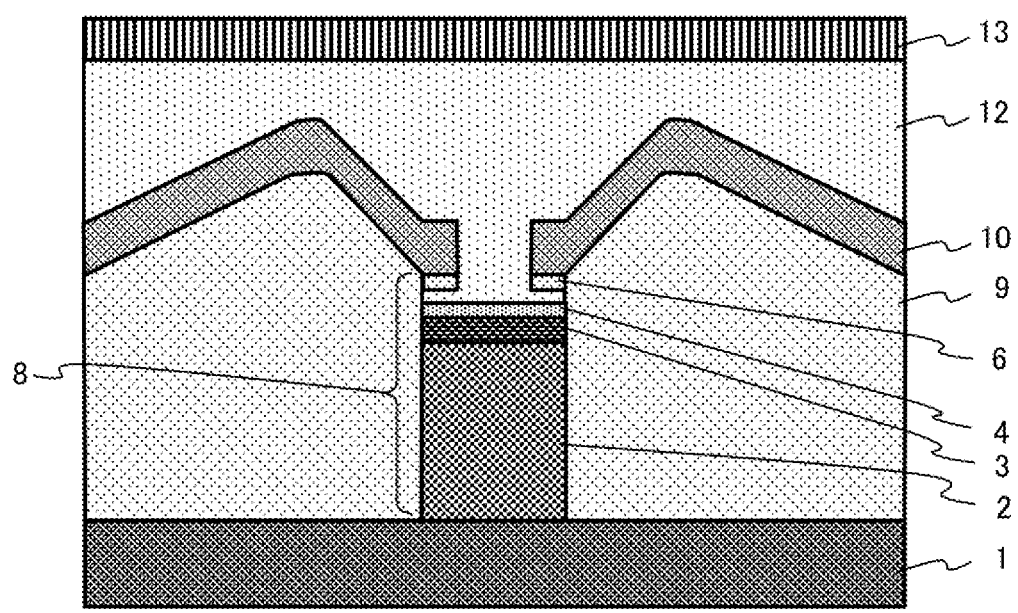
FIG. 17 is a sectional view showing a manufacturing step for the optical semiconductor device according to Embodiment 2.

Subsequently, as shown in FIG. 17, a p-type InP cladding layer 12 (having a thickness of 100 to 4000 nm and a carrier concentration of 0.1 to 3.0×10E+18 cm$^{-3}$) and a p-type InGaAs contact layer 13 (having a thickness of 100 to 1000 nm and a carrier concentration of 1.0 to 10.0×10E+18 cm$^{-3}$) are stacked in this order (Step S209).

On this occasion, the carrier concentration of the P-type InP cladding layer 12 is set to be lower than the carrier concentration of the p-type InP cladding layer 6.

Lastly, a p-side electrode 14 is provided on the surface of the p-type InGaAs contact layer 13 and an n-side electrode 15 is provided on the back surface of the n-type InP substrate 1, so that the optical semiconductor device 102 shown in FIG. 12 is achieved.

As described above, according to the optical semiconductor device 102 according to Embodiment 2, in the method for manufacturing that optical semiconductor device 102, the step of smoothing the Fe-doped semi-insulating InP layers 9 to be performed in the method for manufacturing the optical semiconductor device 101 according to Embodiment 1 is omitted. Thus, it is possible not only to achieve an effect similar to that in Embodiment 1, but also to reduce the manufacturing cost.

Embodiment 3

In Embodiment 1 and Embodiment 2, cases have been described where each of the p-type InP cladding layers 6 is not directly stacked on the p-type InP cladding layer 4, whereas in Embodiment 3, a case will be described where the former cladding layer is directly stacked on the latter cladding layer.

Figure 18:
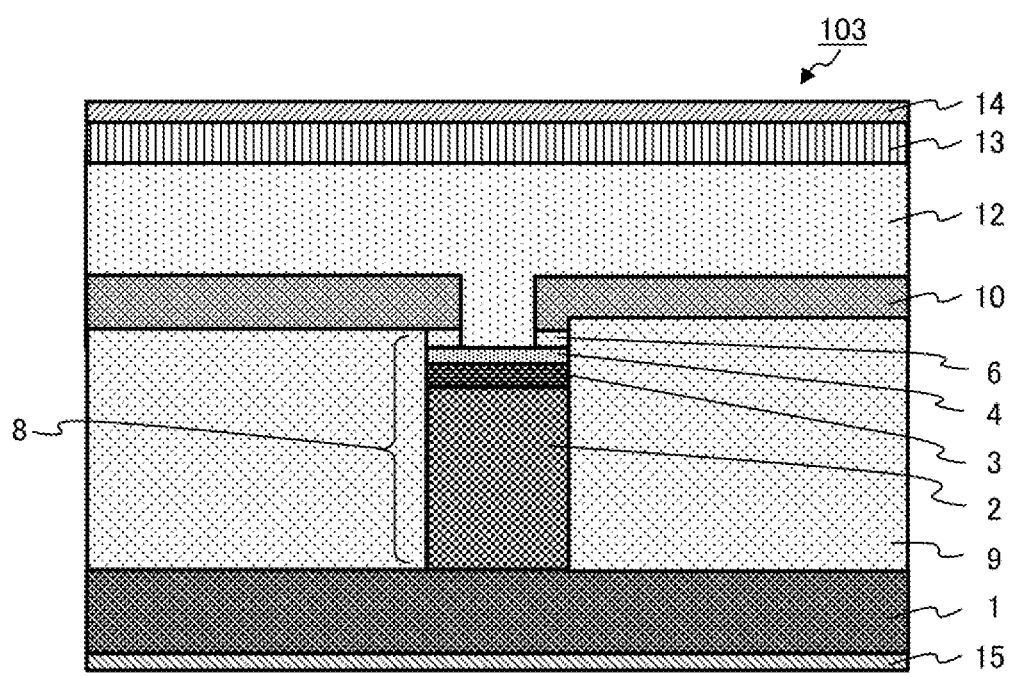
FIG. 18 is a sectional view showing a configuration of an optical semiconductor device according to Embodiment 3.

FIG. 18 is a sectional view showing a configuration of an optical semiconductor device 103 according to Embodiment 3 of this application. As shown in FIG. 18, in the optical semiconductor device 103, the p-type InP cladding layers 6 formed on the respective end portions of the back surfaces of the n-type InP blocking layers 10, are stacked on both end portions of the surface of the p-type InP cladding layer 4. This results in a structure in which the Fe-doped semi-insulating InP layers 9 are not in contact with the p-type InP cladding layer 12 and thus are merely in contact with the p-type InP cladding layer 4. The other configuration of the optical semiconductor device 103 according to Embodiment 3 is similar to that in the optical semiconductor device 101 of Embodiment 1, so that reference numerals that are the same as in FIG. 1 are given to the corresponding parts and description thereof is omitted here.

Figure 19:
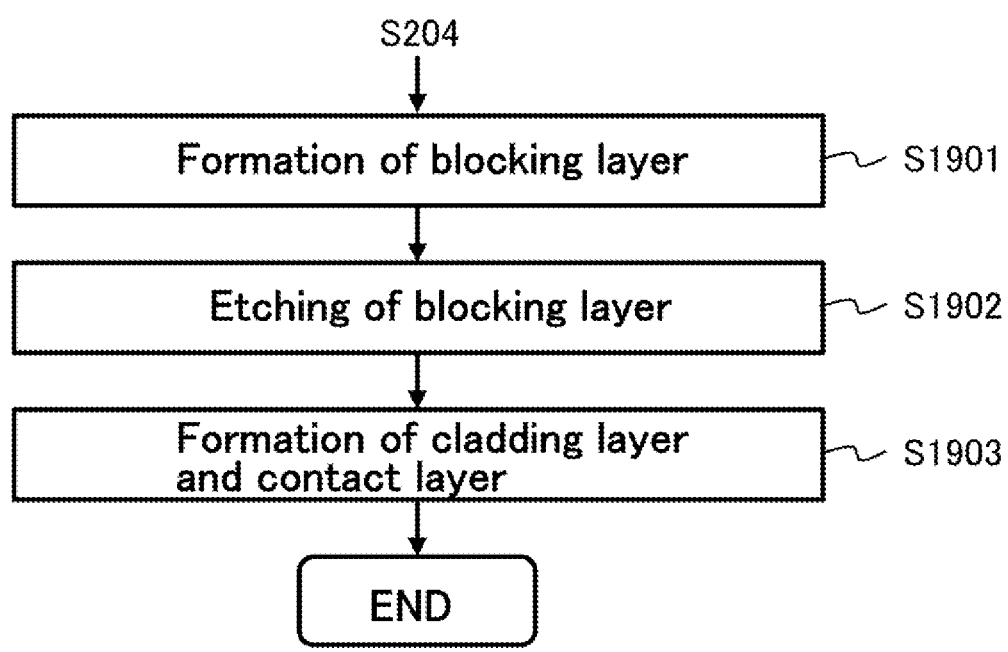
FIG. 19 is a flowchart showing manufacturing steps of the optical semiconductor device according to Embodiment 3.

Next, description will be made about a method for manufacturing the optical semiconductor device 103 according to Embodiment 3 of this application. FIG. 19 is a flowchart showing manufacturing steps of the optical semiconductor device 103 according to Embodiment 3. It should be noted that the manufacturing steps of the optical semiconductor device 103 according to Embodiment 3 are in common with steps in the flowchart (FIG. 2) showing the manufacturing steps of the optical semiconductor device 101 of Embodiment 1 until the burying layers are smoothed (Step S204 in FIG. 2), so that FIG. 2 is also used here. FIG. 20 to FIG. 26 are sectional views each showing a manufacturing step for the optical semiconductor device 103 corresponding to FIG. 18.

Figure 20:
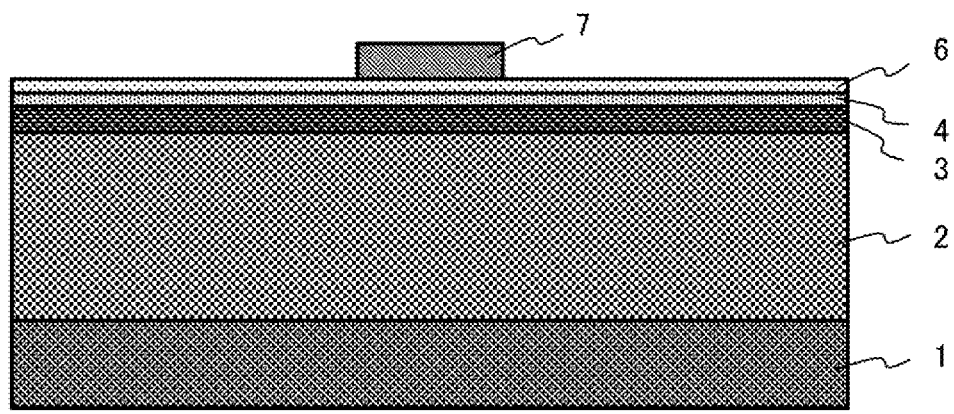
FIG. 20 is a sectional view showing a manufacturing step for the optical semiconductor device according to Embodiment 3.

First, as shown in FIG. 20, using an MOCVD method, an n-type InP cladding layer 2 (having a thickness of 100 to 200 nm and a carrier concentration of 0.1 to $1.0 \times 10E+18$ cm$^{-3}$), an active layer 3 with a multi-quantum well (MQW) structure which will serve as a light-emitting layer, a p-type InP cladding layer 4 (having a thickness of 50 to 400 nm and a carrier concentration of 0.5 to $3.0 \times 10E+18$ cm$^{-3}$), and a p-type InP cladding layer 6 (having a thickness of 50 to 400 nm and a carrier concentration of 1.0 to $3.0 \times 10E+18$ cm$^{-3}$), are stacked, in this order, on the surface of an n-type InP substrate 1 with a plane orientation of (110), and thereafter, an insulating film 7 of SiO$_2$ or the like is deposited on the surface of the p-type InP cladding layer 6 and is processed to have an intended ridge width (Step S201).

It should be noted that the carrier concentration of the p-type InP cladding layer 6 is set to be higher than the carrier concentration of the p-type InP cladding layer 4. The carrier concentration may be freely set to from 0.5 to $3.0 \times 10E+18$ cm$^{-3}$. The ridge width is from about 0.5 to 2.0 μm. Unlike the case of the optical semiconductor device 101 of Embodiment 1, the p-type InGaAsP etching stoper layer 5 is not stacked.

Figure 21:
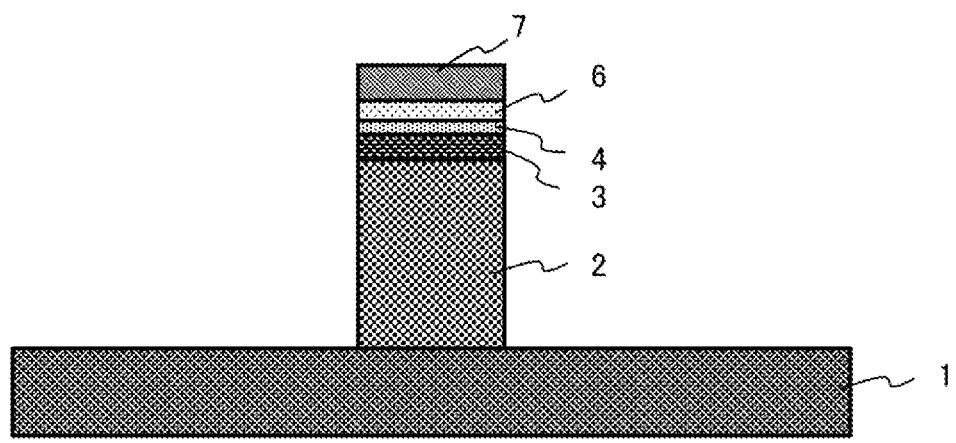
FIG. 21 is a sectional view showing a manufacturing step for the optical semiconductor device according to Embodiment 3.

Subsequently, as shown in FIG. 21, using the insulating film 7 as a mask, a portion from the p-type InP cladding layer 6 to the n-type InP cladding layer 2 or to an intermediate position in the n-type InP substrate 1, is etched by dry etching to thereby form a mesa stripe 8 (Step S202).

Here, dry etching is performed; however, the mesa stripe 8 may be formed by wet etching. The etching depth is about 1 to 4 μm. The mesa stripe extends in in a [011] direction.

Figure 22:
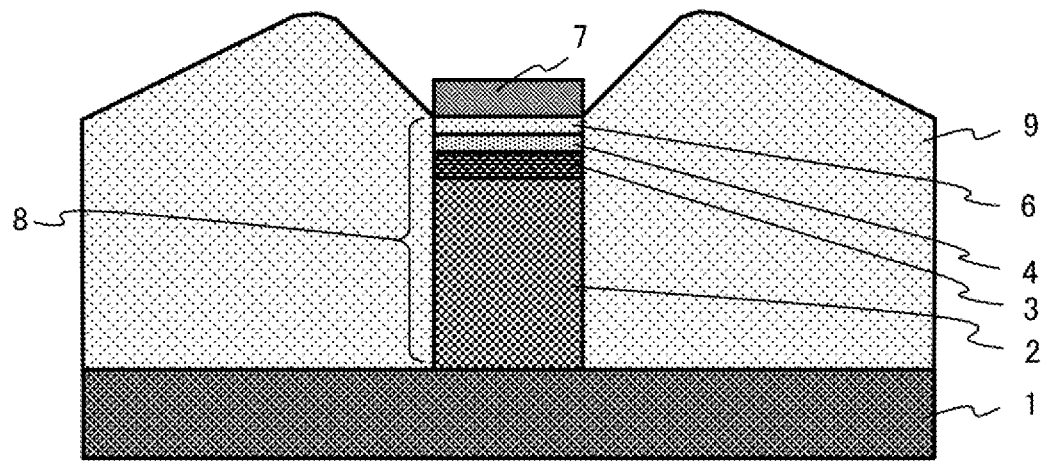
FIG. 22 is a sectional view showing a manufacturing step for the optical semiconductor device according to Embodiment 3.

Then, as shown in FIG. 22, Fe-doped semi-insulating InP layers 9 (having a thickness of 1000 to 4000 nm and a carrier concentration of 0.01 to $9.0 \times 10E+18$ cm$^{-3}$) are grown to bury the both sides of the mesa stripe 8 (Step S203).

On this occasion, the Fe-doped semi-insulating InP layers 9 are grown so that the respective side surfaces of the mesa stripe 8 are entirely covered thereby.

Figure 23:
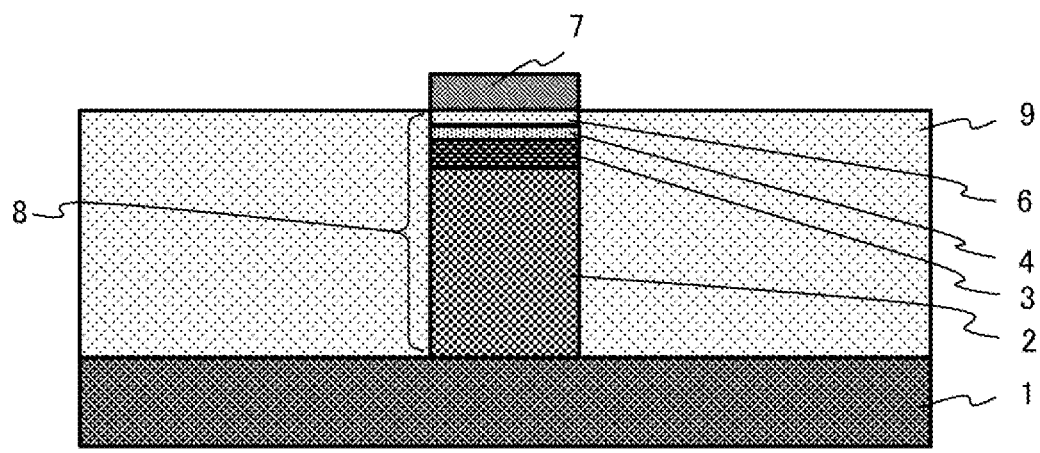
FIG. 23 is a sectional view showing a manufacturing step for the optical semiconductor device according to Embodiment 3.

Subsequently, as shown in FIG. 23, the Fe-doped semi-insulating InP layers 9 located on the both sides of the mesa stripe 8 are smoothed in such a manner that the surface protrusions of these layers are removed by an etchant containing hydrogen bromide and acetic acid (Step S204).

Figure 24:
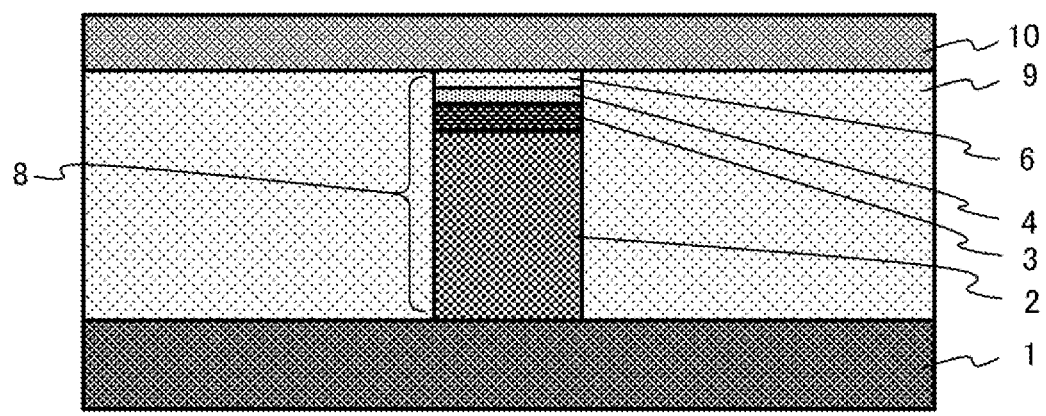
FIG. 24 is a sectional view showing a manufacturing step for the optical semiconductor device according to Embodiment 3.

Then, as shown in FIG. 24, after the insulating film 7 is removed using buffered hydrofluoric acid or hydrofluoric acid, an n-type InP blocking layer 10 (having a thickness of 300 to 1000 nm and a carrier concentration of 2.0 to $9.0 \times 10E+18$ cm$^{-3}$) is stacked (Step S1901).

Figure 25:
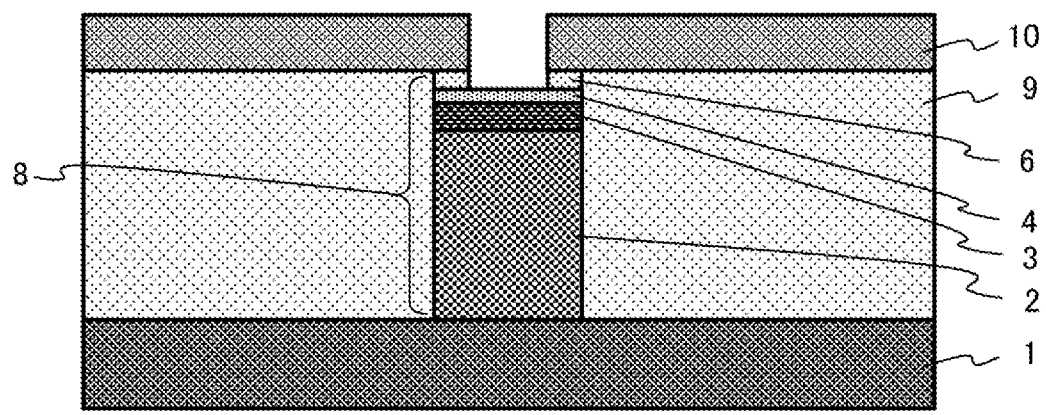
FIG. 25 is a sectional view showing a manufacturing step for the optical semiconductor device according to Embodiment 3.

Subsequently, as shown in FIG. 25, the n-type InP blocking layer 10 and the p-type InP cladding layer 6 are etched by dry etching using an unshown resist as an etching mask in which an opening that is narrower than the width of the active layer and placed above the active layer 3 is created by photolithography (Step S1902).

Figure 26:
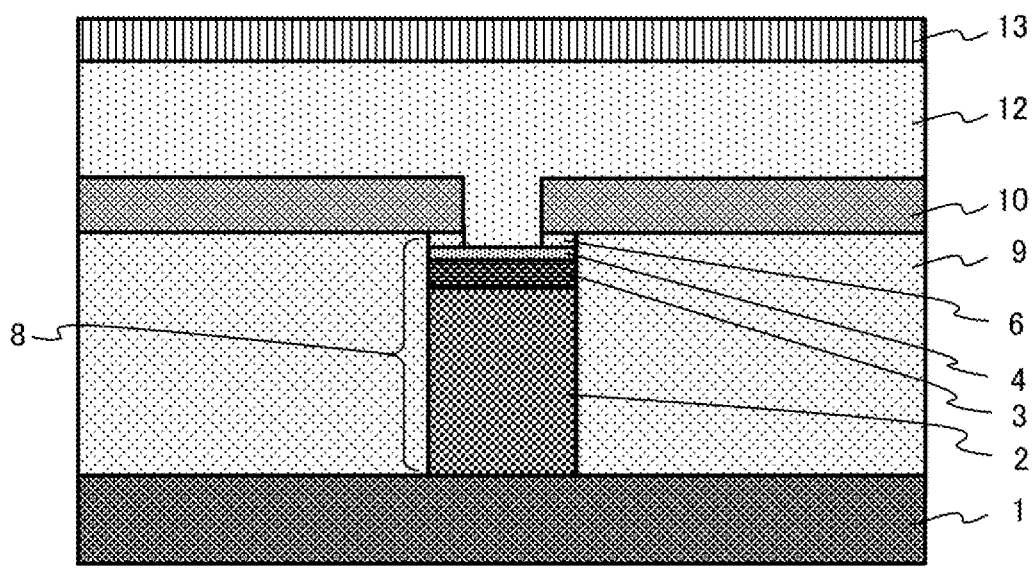
FIG. 26 is a sectional view showing a manufacturing step for the optical semiconductor device according to Embodiment 3.

Then, as shown in FIG. 26, a p-type InP cladding layer 12 (having a thickness of 100 to 4000 nm and a carrier concentration of 0.1 to $3.0 \times 10E+18$ cm$^{-3}$) and a p-type InGaAs contact layer 13 (having a thickness of 100 to 1000 nm and a carrier concentration of 1.0 to $10.0 \times 10E+18$ cm$^{-3}$) are stacked in this order (Step S1903).

On this occasion, the carrier concentration of the P-type InP cladding layer 12 is set to be lower than the carrier concentration of the p-type InP cladding layer 6.

Lastly, a p-side electrode 14 is provided on the surface of the p-type InGaAs contact layer 13 and an n-side electrode 15 is provided on the back surface of the n-type InP substrate 1, so that the optical semiconductor device 103 shown in FIG. 18 is achieved.

As described above, in the optical semiconductor device 103 according to Embodiment 3, the p-type InP cladding layers 6 formed on the respective end portions of the back surfaces of the n-type InP blocking layers 10 are stacked on the surface of the p-type InP cladding layer 4. This results in a structure in which an area where a set of p-type InP cladding layers and the Fe-doped semi-insulating layer are made contact with each other becomes narrower, so that it is possible not only to achieve an effect similar to that in Embodiment 1, but also to further reduce the leakage current from the active layer to the n-type InP blocking layer.

Embodiment 4

In Embodiment 3, the Fe-doped semi-insulating InP layers 9 are smoothed, whereas in Embodiment 4, a case will be described where no smoothing is applied thereto.

Figure 27:
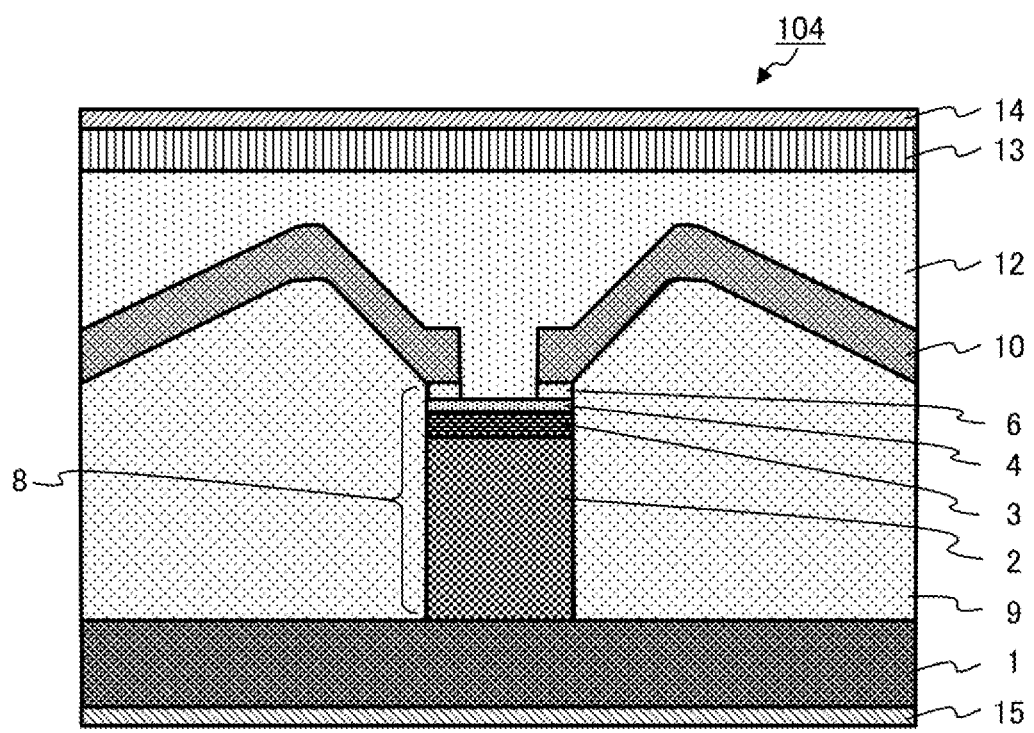
FIG. 27 is a sectional view showing a configuration of an optical semiconductor device according to Embodiment 4.

FIG. 27 is a sectional view showing a configuration of an optical semiconductor device 104 according to Embodiment 4 of this application. As shown in FIG. 27, unlike the optical semiconductor device 103 of Embodiment 3, in the optical semiconductor device 104, Fe-doped semi-insulating InP layers 9 whose surfaces are not smoothed are formed. The other configuration of the optical semiconductor device 104 according to Embodiment 4 is similar to that in the optical semiconductor device 103 of Embodiment 3, so that reference numerals that are the same as those in FIG. 18 are given to the corresponding parts and description thereof is omitted here.

Figure 28:
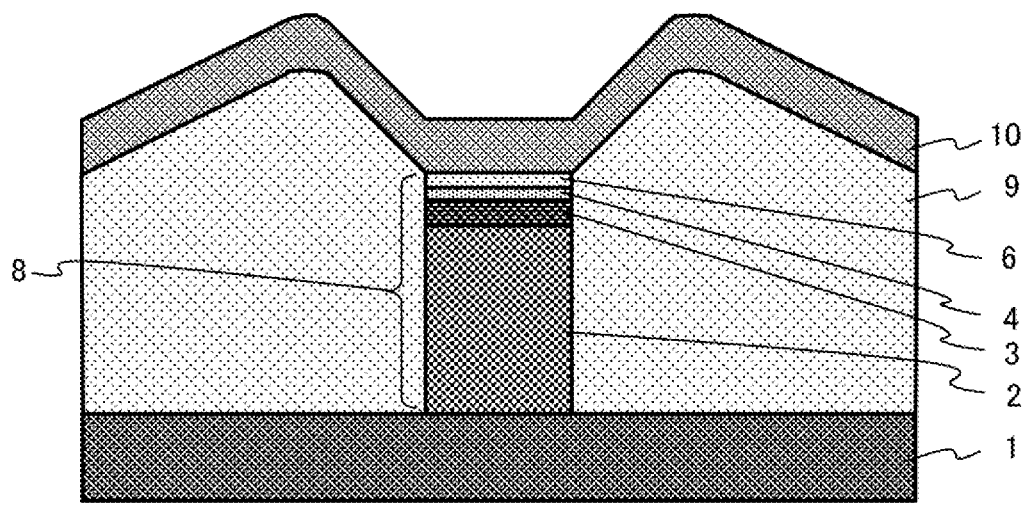
FIG. 28 is a sectional view showing a manufacturing step for the optical semiconductor device according to Embodiment 4.
Figure 29:
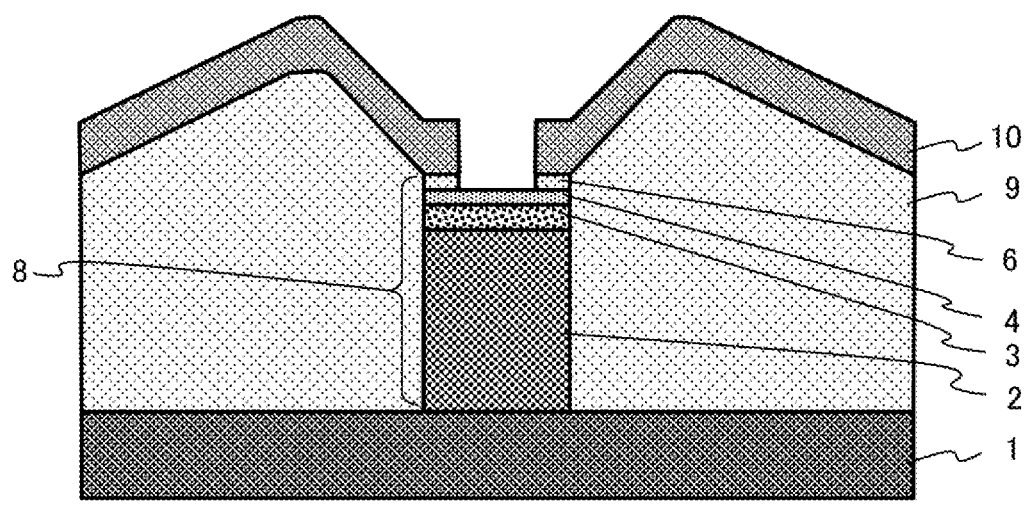
FIG. 29 is a sectional view showing a manufacturing step for the optical semiconductor device according to Embodiment 4.
Figure 30:
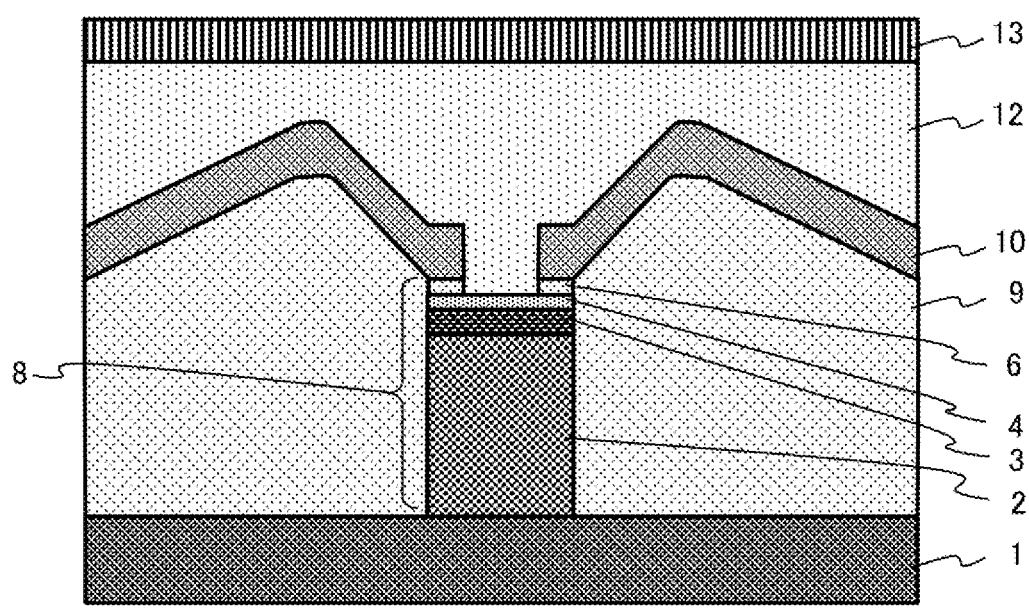
FIG. 30 is a sectional view showing a manufacturing step for the optical semiconductor device according to Embodiment 4.

Next, description will be made about a method for manufacturing the optical semiconductor device 104 according to Embodiment 4 of this application. The manufacturing steps of the optical semiconductor device 104 according to Embodiment 4 are equivalent to the flowcharts (FIG. 2, FIG. 19) showing the manufacturing steps of the optical semiconductor device 103 of Embodiment 3, except that the step of smoothing the burying layers (Step S204 in FIG. 2) is omitted, so that FIG. 2 and FIG. 19 are also used here. FIG. 28 to FIG. 30 are sectional views each showing a manufacturing step for the optical semiconductor device 104 corresponding to FIG. 27.

Initial steps in the method for manufacturing the optical semiconductor device 104 according to Embodiment 4, are similar to the steps from the step of forming the semiconductor layers (Step S201; FIG. 20) to the step of forming the burying layers (Step S203; FIG. 22) in the method for manufacturing the optical semiconductor device 103 of Embodiment 3, so that the description thereof is omitted here.

Then, with respect to the mesa stripe 8 buried by the Fe-doped semi-insulating InP layers 9 in Step S203 (see, FIG. 22), as shown in FIG. 28, after the insulating film 7 is removed using buffered hydrofluoric acid or hydrofluoric acid, an n-type InP blocking layer 10 (having a thickness of 300 to 1000 nm and a carrier concentration of 2.0 to $9.0 \times 10E+18$ $cm^{-3}$) is stacked (Step S1901).

Subsequently, as shown in FIG. 29, the n-type InP blocking layer 10 and the p-type InP cladding layer 6 are etched by dry etching using an unshown resist as an etching mask in which an opening that is narrower than the width of the active layer and placed above the active layer 3 is created by photolithography (Step S1902).

Then, as shown in FIG. 30, a p-type InP cladding layer 12 (having a thickness of 100 to 4000 nm and a carrier concentration of 0.1 to $3.0 \times 10E+18$ $cm^{-3}$) and a p-type InGaAs contact layer 13 (having a thickness of 100 to 1000 nm and a carrier concentration of 1.0 to $10.0 \times 10E+18$ $cm^{-3}$) are stacked in this order (Step S1903).

On this occasion, the carrier concentration of the P-type InP cladding layer 12 is set to be lower than the carrier concentration of the p-type InP cladding layer 6.

Lastly, a p-side electrode 14 is provided on the surface of the p-type InGaAs contact layer 13 and an n-side electrode 15 is provided on the back surface of the n-type InP substrate 1, so that the optical semiconductor device 104 shown in FIG. 27 is achieved.

As described above, according to the optical semiconductor device 104 according to Embodiment 4, in the method for manufacturing that optical semiconductor device 104, the step of smoothing the Fe-doped semi-insulating InP layers 9 to be performed in the method for manufacturing the optical semiconductor device 103 according to Embodiment 3 is omitted. Thus, it is possible not only to achieve an effect similar to that in Embodiment 3, but also to reduce the manufacturing cost.

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another

DESCRIPTION OF REFERENCE NUMERALS AND SIGNS

1: n-type InP substrate, 2: n-type InP cladding layer, 3: active layer, 4: p-type InP cladding layer (second conductivity-type first cladding layer), 5: p-type InGaAsP etching stopper layer, 6: p-type InP cladding layer (second conductivity-type second cladding layer), 8: mesa stripe, 9: Fe-doped semi-insulating InP layer (burying layer), 10: n-type InP blocking layer, 12: p-type InP cladding layer (second conductivity-type third cladding layer), 101, 102, 103, 104: optical semiconductor device.

The invention claimed is:

1. A method for manufacturing an optical semiconductor device, comprising:
    a step of sequentially stacking a first conductivity-type cladding layer, an active layer and a second conductivity-type first cladding layer, on a surface of a first conductivity-type semiconductor substrate, and then sequentially stacking further an etching stopper layer and a second conductivity-type second cladding layer, to thereby form semiconductor layers;
    a step of etching the semiconductor layers to form a mesa stripe;
    a step of forming burying layers on both sides of the mesa stripe;
    a step of forming a first conductivity-type blocking layer on a top of the mesa stripe and surfaces of the burying layers;
    a step of forming a mask exposing an area of the first conductivity-type blocking layer corresponding to a central portion of the active layer as viewed from a direction perpendicular to a cross-section of the mesa stripe, and then performing etching up to the etching stopper layer to create an opening;
    a step of removing the mask and the etching stopper layer; and
    a step of stacking a second conductivity-type third cladding layer on a surface inside the opening and a surface of the first conductivity-type blocking layer, and then stacking a second conductivity-type contact layer;
    wherein the second conductivity-type first cladding layer has a carrier concentration that is lower than a carrier concentration of the second conductivity-type second cladding layer, and is formed between the second conductivity-type second cladding layer and the active layer and on that active layer; and
    wherein a carrier concentration of the second conductivity-type third cladding layer is set to be lower than the carrier concentration of the second conductivity-type second cladding layer.

2. The method for manufacturing an optical semiconductor device of claim 1, wherein a second conductivity-type InGaAsP layer is used as the etching stopper layer, and a first conductivity-type InGaAs layer is used as the mask.

3. A method for manufacturing an optical semiconductor device, comprising:
    a step of sequentially stacking a first conductivity-type cladding layer, an active layer and a second conductivity-type first cladding layer, on a surface of a first conductivity-type semiconductor substrate, and then further stacking a second conductivity-type second cladding layer, to thereby form semiconductor layers;

a step of etching the semiconductor layers to form a mesa stripe;

a step of forming burying layers on both sides of the mesa stripe;

a step of forming a first conductivity-type blocking layer on a top of the mesa stripe and surfaces of the burying layers;

a step of forming a mask exposing an area of the first conductivity-type blocking layer corresponding to a central portion of the active layer as viewed from a direction perpendicular to a cross-section of the mesa stripe, and then etching the first conductivity-type blocking layer and the second conductivity-type second cladding layer to create an opening;

a step of removing the mask; and a step of stacking a second conductivity-type third cladding layer on a surface inside the opening and a surface of the first conductivity-type blocking layer, and then stacking a second conductivity-type contact layer;

wherein the second conductivity-type first cladding layer has a carrier concentration that is lower than a carrier concentration of the second conductivity-type second cladding layer, and is formed between the second conductivity-type second cladding layer and the active layer and on that active layer; and wherein a carrier concentration of the second conductivity-type third cladding layer is set to be lower than the carrier concentration of the second conductivity-type second cladding layer.

4. The method for manufacturing an optical semiconductor device of claim 1, further comprising a step of smoothing the burying layers after the step of forming the burying layers.

5. The method for manufacturing an optical semiconductor device of claim 2, further comprising a step of smoothing the burying layers after the step of forming the burying layers.

6. The method for manufacturing an optical semiconductor device of claim 3, further comprising a step of smoothing the burying layers after the step of forming the burying layers.

7. The method for manufacturing an optical semiconductor device of claim 1, wherein the step of etching the semiconductor layers includes etching the first conductivity-type cladding layer, the active layer, the second conductivity-type first cladding layer, the etching stopper layer, and the second conductivity-type second cladding layer to form the mesa stripe.

8. The method for manufacturing an optical semiconductor device of claim 1, wherein the step of forming the first conductivity-type blocking layer on the top of the mesa stripe and the surfaces of the burying layers is performed after the step of forming the burying layers.

9. The method for manufacturing an optical semiconductor device of claim 3, wherein the step of etching the semiconductor layers includes etching the first conductivity-type cladding layer, the active layer, the second conductivity-type first cladding layer, and the second conductivity-type second cladding layer to form the mesa stripe.

10. The method for manufacturing an optical semiconductor device of claim 3, wherein the step of forming the first conductivity-type blocking layer on the top of the mesa stripe and the surfaces of the burying layers is performed after the step of forming the burying layers.

* * * * *